United States Patent Office 2,947,219
Patented Aug. 2, 1960

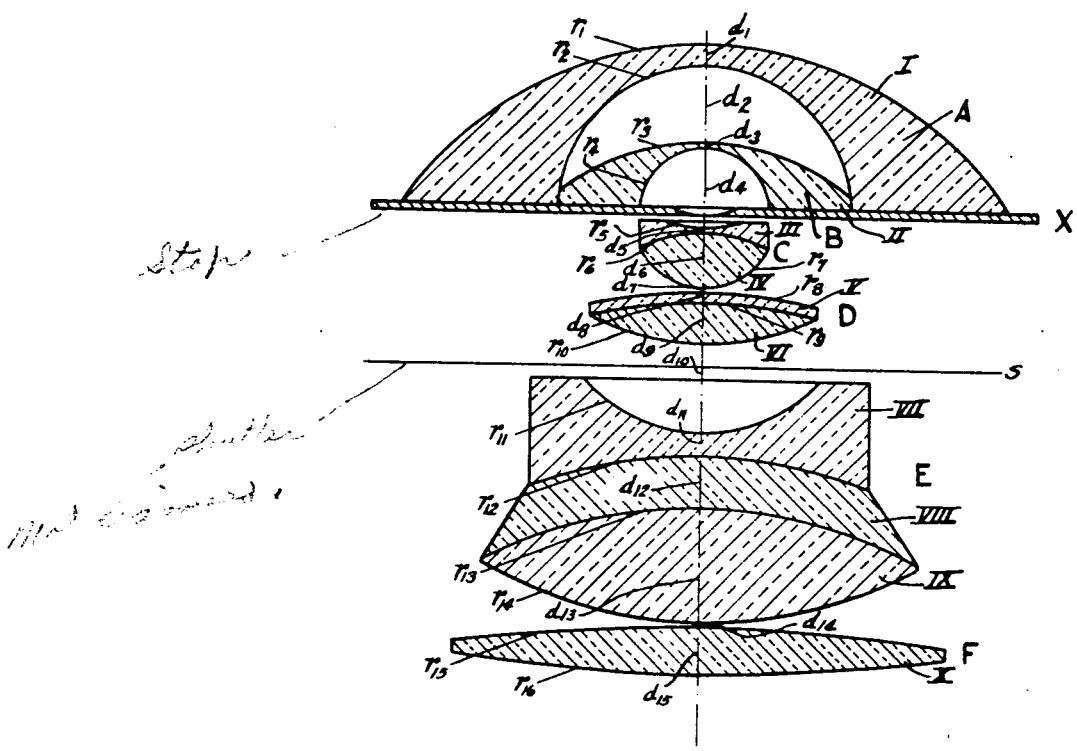

2,947,219
WIDE-ANGLE OBJECTIVE LENS
Abraham C. S. van Heel, Delft, Gerardus J. Beernink, The Hague, and Hendrik J. Raterink, Rijswijk Z.H., Netherlands, assignors to Nederlandse Organisatie voor Toegepast - Natuurwetenschappelijk Onderzoek Ten Behoeve van de Rijksverdediging (The National Defence Research Council-T.N.O.), The Hague, Netherlands, a corporation of the Netherlands
Filed July 24, 1958, Ser. No. 750,739
Claims priority, application Netherlands Aug. 7, 1957
3 Claims. (Cl. 88—57)

The invention relates to a wide-angle objective lens.

Wide-angle lens systems for photographic purposes covering a field of view of more than 180° are known in the art. These wide-angle systems comprise two parts, a negative front system operating as a field compressor and comprising one or more negative meniscus lenses having a back surface which is substantially semi-spherical in shape, a fixed diaphragm or stop and behind this a positive part of the system consisting of more than one lens.

The prior art lens with the largest wide-angle covers a field of view of 210°, however, owing to the low light intensity in the region of the border of the field it requires an exposure time of more than one second under moderately bright weather conditions even if a rapid negative film is applied, its positive part being composed of two lenses: the first, a doublet lens being positioned just behind the stop and the second lens, which has a great focal distance, at a substantial distance behind this.

The object of the invention is to provide for a wide-angle objective covering a field of view of up to about 270°.

Another object of the present invention is to provide for a wide-angle objective having sufficient light intensity in the region of the border of the field of view to permit a light exposure time of less than one tenth of a second under moderately bright weather conditions.

In the objective of the invention the field compressor system comprises at least two negative meniscus lenses having substantially semi-spherical back surfaces, the centre of which being positioned approximately in the plane of the stop, and the positive system comprises (a) a positive lens positioned close behind the stop, giving a positive resulting focal distance, and being a doublet lens composed of a biconcave part and a biconvex part cemented together, (b) a positive lens which may be of the doublet type, (c) a triplet lens composed of a biconcave, a concave-convex and a biconvex part, cemented together and (d) a fourth lens having a great focal length, the total axial thickness of the said positive triplet lens being greater than the focal distance of the complete objective.

The figure of the drawing illustrates an embodiment of the complete objective.

The curvature of the image field of our wide-angle lens is only small and also the other optical aberrations are small as a result of which our lens has proved itself very useful in practice.

A very appropriate embodiment of a lens according to the invention complies with the magnitudes given in Table I and is shown in the drawing.

In the figure X is the stop. A and B are the two negative meniscus component lenses before the stop, while the component lenses C, D, E and F are positioned behind the stop. As shutter mechanism, a commercially available compur shutter (S) has been mounted in a suitable manner e.g. between the component lenses D and E.

The cemented surface $r_9$ is preferably present, although this is not strictly necessary. By splitting up lenses by means of cemented surfaces the quality can be even improved further, if desired. It is remarked that the colour aberrations are mainly corrected by the curvature of the surfaces $r_5$, $r_6$, $r_{11}$ and $r_{12}$; the curvature of the image field is highly influenced by surface $r_{11}$; the astigmatism by surface $r_{13}$, while the correction conditions for the reduction of coma are considerably influenced by surfaces $r_{15}$ and $r_{16}$.

Table I

| Lens | Refractive Index | Abbe's Number | Type of Glass | Lens Components | Radius, mm. | Axial Distance, mm. |
|---|---|---|---|---|---|---|
| I | 1.53996 | 59.6 | BaK2 | A | $r_1 = +28.81$ | $d_1 = 1.50$ |
|   |   |   |   |   | $r_2 = +11.67$ |   |
|   |   |   |   |   |   | $d_2 = 5.50$ |
| II | 1.53996 | 59.6 | BaK2 | B | $r_3 = +18.54$ | $d_3 = 0.95$ |
|   |   |   |   |   | $r_4 = + 5.15$ |   |
| Stop (X) |   |   |   |   |   | $d_4 = \frac{5.22}{1.00}$ |
| III | 1.56732 | 42.8 | LF6 | C | $r_5 = -10.00$ | $d_5 = 0.60$ |
| IV | 1.56873 | 63.1 | PSK2 |   | $r_6 = +10.00$ |   |
|   |   |   |   |   | $r_7 = - 5.85$ | $d_6 = 4.40$ |
|   |   |   |   |   |   | $d_7 = 0.25$ |
| V | 1.56873 | 63.1 | PSK2 | D | $r_8 = +43.53$ | $d_8 = 1.00$ |
| VI | 1.58313 | 59.3 | SK12 |   | $r_9 = +43.53$ | $d_9 = 3.00$ |
|   |   |   |   |   | $r_{10} = -22.94$ |   |
|   |   |   |   |   |   | $d_{10} = 7.00$ |
| VII | 1.5927 | 35.4 | F16 | E | $r_{11} = -12.70$ | $d_{11} = 1.80$ |
| VIII | 1.4875 | 70.0 | FK5 |   | $r_{12} = +37.04$ | $d_{12} = 4.20$ |
| IX | 1.7130 | 53.8 | LaK8 |   | $r_{13} = +37.04$ | $d_{13} = 9.0$ |
|   |   |   |   |   | $r_{14} = -37.04$ |   |
|   |   |   |   |   |   | $d_{14} = 0.2$ |
| X | 1.4875 | 70.0 | FK5 | F | $r_{15} = +147.90$ | $d_{15} = 4.0$ |
|   |   |   |   |   | $r_{16} = -120.00$ |   |

$f'$ (ABC) = −34.8 mm.
$f'$ (ABCD) = 8.3 mm. $1f' = 19.3$ mm.
$f'$ (ABCDE) = 13.3 mm.
$f'$ (ABCDEF) = 12.3 mm. $1f' = 9.5$ mm.

The types of glass BaK2 etc. show the commercial names of the types of glass concerned (as they are produced by the German firm of Schott und Gen.); $f'$ is the focal distance of the lens combination indicated and $1f'$ the axial distance between the focal point and the adjacent lens surface.

The diameter of the diaphragm amounted to 1.4–2.0 mm.

If the diameter of the fixed diaphragm is 2.0 mm., the diameter of the cross-section in the object space of a parallel paraxial pencil of light rays, which after refraction at the front part of the optical system just fills the diaphragm (viz. the diameter of the entrance pupil), is 1.2 mm.; the relative aperture on the optical axis is then, without filter, $f/10$. The best results have been obtained with a diaphragm with a diameter of 1.4 mm.

Table II shows the variations in the optical magnitudes of the wide-angle system according to the invention, within which good results will be obtained.

Table II

| Lens Components | Radii of Surfaces | Axial Thicknesses and Separations |
| --- | --- | --- |
| A | $1.8f < +r_1 < 2.7f$<br>$0.7f < +r_2 < 1.2f$ | $0.08f < +d_{1-2} < 0.16f$<br>$0.30f < +d_{2-3} < 0.60f$ |
| B | $1.1f < +r_3 < 1.8f$<br>$0.2f < +r_4 < 0.6f$ | $0.06f < +d_{3-4} < 0.12f$<br>$0.30f < +d_{4-5} < 0.70f$ |
| C | $0.5f < -r_5 < 1.2f$<br>$0.5f < +r_6 < 1.5f$<br>$0.4f < -r_7 < 0.6f$ | $0.03f < +d_{5-6} < 0.10f$<br>$0.25f < +d_{6-7} < 0.50f$<br>$0.01f < +d_{7-8} < 0.05f$ |
| D | $2.5f < +r_8 < 4.5f$<br>$1.8f < +r_9 < 6.0f$<br>$1.5f < -r_{10} < 3.0f$ | $0.05f < +d_{8-9} < 0.15f$<br>$0.15f < +d_{9-10} < 0.35f$<br>$0.35f < +d_{10-11} < 0.75f$ |
| E | $0.7f < +r_{11} < 1.5f$<br>$1.5f < +r_{12} < 4.5f$<br>$1.5f < +r_{13} < 4.5f$<br>$2.0f < -r_{14} < 4.0f$ | $0.10f < +d_{11-12} < 0.40f$<br>$0.20f < +d_{12-13} < 0.50f$<br>$0.50f < +d_{13-14} < 0.90f$<br>$0.01f < +d_{14-15} < 0.10f$ |
| F | $8.0f < +r_{15} < 16.0f$<br>$5.0f < -r_{16} < 13.0f$ | $0.20f < +d_{15-16} < 0.45f$ |

$0.10f <$ diameter of diaphragm $< 0.25f$

| Refractive Indices | Dispersion or Abbe Numbers |
| --- | --- |
| $1.38 < n_{1-2} < 1.61$ | $55 < V_{1-2} < 95$ |
| $1.38 < n_{3-4} < 1.61$ | $55 < V_{3-4} < 95$ |
| $1.52 < n_{5-6} < 1.61$ | $25 < V_{5-6} < 45$ |
| $1.52 < n_{6-7} < 1.61$ | $55 < V_{6-7} < 70$ |
| $1.52 < n_{8-9} < 1.61$ | $50 < V_{8-9} < 70$ |
| $1.52 < n_{9-10} < 1.61$ | $50 < V_{9-10} < 70$ |
| $1.55 < n_{11-12} < 1.68$ | $25 < V_{11-12} < 40$ |
| $1.38 < n_{12-13} < 1.53$ | $60 < V_{12-13} < 95$ |
| $1.65 < n_{13-14} < 1.75$ | $45 < V_{13-14} < 60$ |
| $1.38 < n_{15-16} < 1.53$ | $60 < V_{15-16} < 95$ |

RANGE OF INDIVIDUAL LENS COMPONENT FOCAL LENGTHS IN ORDER FROM FRONT TO REAR $2.6 f < -f'A < 3.5 f$
$0.9 f < -f'B < 1.3 f$
$1.2 f < f'C < 1.6 f$
$1.8 f < f'D < 2.5 f$
$4.5 f < -f'E < 6.3 f$
$9.4 f < f'F < 12.8 f$

Herein $r$ is the radius of curvature; $d$ is the axial distance between the various surfaces; $n$ the refractive index for the D-line, N is the dispersion (Abbe's number).

It is remarked that it is known for wide-angle lenses with a field of vision of 180° and more to cause a certain ton-shaped or negative distortion with a view to obtaining sufficient light intensity at the borders of the image.

With the wide-angle system according to the invention it is only where the field of vision exceeds 2 x 80° (taken from the centre of the view) that a distortion becomes perceivable.

Chromatic aberration is mainly only present as chromatic magnifying aberration, which is substantially eliminated with a faintly red filter (e.g. filter No. R586 of Gevaert).

By the use of such a filter satisfactory images are obtained with a usual film, type 120 with a sensitivity of 17/10 Din (=32 ASA) under moderately bright weather conditions, the time of exposure being ½₂₅ second, the wide-angle objective being mounted in a camera of a commercially available type (e.g. the "Rada Rollfilmkassette" type "Rietzschelfalz" Model 710, produced in Germany).

The diameter of the image on the negative amounts to 40 mm. using the embodiment according to Table I.

We claim:

1. In photographic wide-angle objective comprising a field compressor component composed of at least two negative meniscus lenses having substantially semi-spherical back surfaces the centers of which are positioned approximately in the center of a stop located close behind said field compressor component, and a positive lens component containing a foremost positive doublet component positioned close behind the said stop, and a backmost biconvex positive component having a focal length many times greater than the focal length of the total lens system, the improvement comprising, that between the said two positive components there are situated a positive biconvex component and a triplet component consisting of a biconcave, a concave-convex and a biconvex part cemented together, the total axial thickness of the said triplet component being greater than the focal distance of the total objective; the range for the individual focal lengths of the individual components in order from front to rear wherein $f$ represents the focal length of the objective are $2.6 f < -f'A < 3.5 f$
$0.9 f < -f'B < 1.3 f$
$1.2 f < f'C < 1.6 f$
$1.8 f < f'D < 2.5 f$
$4.5 f < -f'E < 6.3 f$
$9.4 f < f'F < 12.8 f$ the Abbe number of the concave-convex part of the said triplet component being about twice as high as that of the biconcave part of said triplet component, both of said parts having a moderately high refraction index, the third (biconvex) part of said triplet component having a high refraction index as compared with that of the other parts and an Abbe number lying between those of the first two parts of the said component, the axial distance between said positive biconvex component and said triplet component being between 0.35 and 0.75 times the focal length of the total objective.

2. A wide-angle objective according to claim 1 characterized by the following magnitudes:

| Lens | Refractive Index | Abbe's Number | Lens Components | Radius, mm. | Axial Distance, mm. |
| --- | --- | --- | --- | --- | --- |
| I | 1.53996 | 59.6 | A | $r_1 = +28.81$ | $d_1 = 1.50$ |
| | | | | $r_2 = +11.67$ | $d_2 = 5.50$ |
| II | 1.53996 | 59.6 | B | $r_3 = +18.54$ | $d_3 = 0.95$ |
| | | | | $r_4 = +5.15$ | $d_4 = \frac{5.22}{1.00}$ |
| Stop (X) | | | | | |
| III | 1.56732 | 42.8 | C | $r_5 = -10.00$ | $d_5 = 0.60$ |
| IV | 1.56873 | 63.1 | | $r_6 = +10.00$ | $d_6 = 4.40$ |
| | | | | $r_7 = -5.85$ | $d_7 = 0.25$ |
| V | 1.56873 | 63.1 | D | $r_8 = +43.53$ | $d_8 = 1.00$ |
| VI | 1.58313 | 59.3 | | $r_9 = +43.53$ | $d_9 = 3.00$ |
| | | | | $r_{10} = -22.94$ | $d_{10} = 7.00$ |
| VII | 1.5927 | 35.4 | E | $r_{11} = -12.70$ | $d_{11} = 1.80$ |
| VIII | 1.4875 | 70.0 | | $r_{12} = +37.04$ | $d_{12} = 4.20$ |
| IX | 1.7130 | 53.8 | | $r_{13} = +37.04$ | $d_{13} = 9.0$ |
| | | | | $r_{14} = -37.04$ | $d_{14} = 0.2$ |
| X | 1.4875 | 70.0 | F | $r_{15} = +147.90$ | $d_{15} = 4.0$ |
| | | | | $r_{16} = -120.00$ | |

$f'$ (ABC) = 34.8 mm.
$f'$ (ABCD) = 8.3 mm.  $1f' = 19.3$ mm.
$f'$ (ABCDE) = 12.3 mm.
$f'$ (ABCDEF) = 12.3 mm.  $1f' = 9.5$ mm.

3. A wide-angle objective according to claim 1 characterized by the following magnitudes:

| Radii of Surfaces | Axial Thicknesses and Separations |
|---|---|
| $1.8f < +r_1 < 2.7f$ | $0.08f < +d_{1-2} < 0.16f$ |
| $0.7f < +r_2 < 1.2f$ | $0.30f < +d_{2-3} < 0.60f$ |
| $1.1f < +r_3 < 1.8f$ | $0.06f < +d_{3-4} < 0.12f$ |
| $0.2f < +r_4 < 0.6f$ | $0.30f < +d_{4-5} < 0.70f$ |
| $0.5f < -r_5 < 1.2f$ | $0.03f < +d_{5-6} < 0.10f$ |
| $0.5f < +r_6 < 1.5f$ | $0.25f < +d_{6-7} < 0.50f$ |
| $0.4f < -r_7 < 0.6f$ | $0.01f < +d_{7-8} < 0.05f$ |
| $2.5f < +r_8 < 4.5f$ | $0.05f < +d_{8-9} < 0.15f$ |
| $1.8f < +r_9 < 6.0f$ | $0.15f < +d_{9-10} < 0.35f$ |
| $1.5f < -r_{10} < 3.0f$ | $0.35f < +d_{10-11} < 0.75f$ |
| $0.7f < -r_{11} < 1.5f$ | $0.10f < +d_{11-12} < 0.40f$ |
| $1.5f < +r_{12} < 4.5f$ | $0.20f < +d_{12-13} < 0.50f$ |
| $1.5f < +r_{13} < 4.5f$ | $0.50f < +d_{13-14} < 0.90f$ |
| $2.0f < -r_{14} < 4.0f$ | $0.01f < +d_{14-15} < 0.10f$ |
| $8.0f < +r_{15} < 16.0f$ | $0.20f < +d_{15-16} < 0.45f$ |
| $5.0f < +r_{16} < 13.0f$ | |

$0.10f <$ diameter of diaphragm $< 0.25f$

| Refractive Indices | Dispersion or Abbe Numbers |
|---|---|
| $1.38 < n_{1-2} < 1.61$ | $55 < V_{1-2} < 95$ |
| $1.38 < n_{3-4} < 1.61$ | $55 < V_{3-4} < 95$ |
| $1.52 < n_{5-6} < 1.61$ | $25 < V_{5-6} < 45$ |
| $1.52 < n_{6-7} < 1.61$ | $55 < V_{6-7} < 70$ |
| $1.52 < n_{8-9} < 1.61$ | $50 < V_{8-9} < 70$ |
| $1.52 < n_{9-10} < 1.61$ | $50 < V_{9-10} < 70$ |
| $1.55 < n_{11-12} < 1.68$ | $25 < V_{11-12} < 40$ |
| $1.38 < n_{12-13} < 1.53$ | $60 < V_{12-13} < 95$ |
| $1.65 < n_{13-14} < 1.75$ | $45 < V_{13-14} < 60$ |
| $1.38 < n_{15-16} < 1.53$ | $60 < V_{15-16} < 95$ | in which $r$ is the radius of curvature, $d$ the axial distance, $n$ the refractive index (D-line), $f$ the focal length of the objective and V is the Abbe's number of the lens parts indicated.

References Cited in the file of this patent

UNITED STATES PATENTS

| | | |
|---|---|---|
| 2,146,662 | Van Albada | Feb. 7, 1939 |
| 2,187,780 | Gehrke et al. | Jan. 23, 1940 |
| 2,324,081 | Herzberger | July 13, 1943 |
| 2,373,815 | Del Riccio | Apr. 17, 1945 |

FOREIGN PATENTS

| | | |
|---|---|---|
| 225,398 | Great Britain | Dec. 4, 1924 |
| 755,955 | Great Britain | Aug. 29, 1956 |
| 384,879 | Germany | Nov. 9, 1923 |
| 620,538 | Germany | Oct. 23, 1935 |
| 672,393 | Germany | Mar. 1, 1939 |
| 677,592 | Germany | June 29, 1939 |